United States Patent [19]

Stirling

[11] 4,349,505
[45] Sep. 14, 1982

[54] NEUTRAL BEAMLINE WITH ION ENERGY RECOVERY BASED ON MAGNETIC BLOCKING OF ELECTRONS

[75] Inventor: William L. Stirling, Oak Ridge, Tenn.

[73] Assignee: The United States of America as represented by the Department of Energy, Washington, D.C.

[21] Appl. No.: 164,990

[22] Filed: Jul. 1, 1980

[51] Int. Cl.³ .............................................. G21B 1/00
[52] U.S. Cl. .................................. 376/130; 250/251; 376/147
[58] Field of Search ................. 376/130, 147; 250/251

[56] References Cited

U.S. PATENT DOCUMENTS

| 3,663,360 | 5/1972 | Post | 176/3 |
| 3,668,065 | 6/1972 | Moir | 176/3 |
| 3,713,967 | 1/1973 | Hamilton et al. | 176/3 |

OTHER PUBLICATIONS

EUR-CEA-FC-823 (6/76) Association Euratom—CEA France, P. Raimbault.
Proc. 7th Syp. on Eng., Pbs. of Fus. Res., vol. 1, p. 308, Barr et al.

Primary Examiner—Sal Cangialosi
Attorney, Agent, or Firm—David E. Breeden; Stephen D. Hamel; Richard G. Besha

[57] ABSTRACT

A neutral beamline generator with energy recovery of the full-energy ion component of the beam based on magnetic blocking of electrons is provided. Ions from a positive ion source are accelerated to the desired beam energy from a slightly positive potential level with respect to ground through a neutralizer cell by means of a negative acceleration voltage. The unneutralized full-energy ion component of the beam exiting the neutralizer are retarded and slightly deflected and the electrons in the neutralizer are blocked by a magnetic field generated transverse to the beamline. An electron collector in the form of a coaxial cylinder surrounding and protruding axial a few centimeters beyond the neutralizer exit terminates the electrons which exit the neutralizer in an E x B drift to the collector when the collector is biased a few hundred volts positive with respect to the neutralizer voltage. The neutralizer is operated at the negative acceleration voltage, and the deflected full energy ions are decelerated and the charge collected at ground potential thereby expending none of their energy received from the acceleration power supply.

9 Claims, 5 Drawing Figures

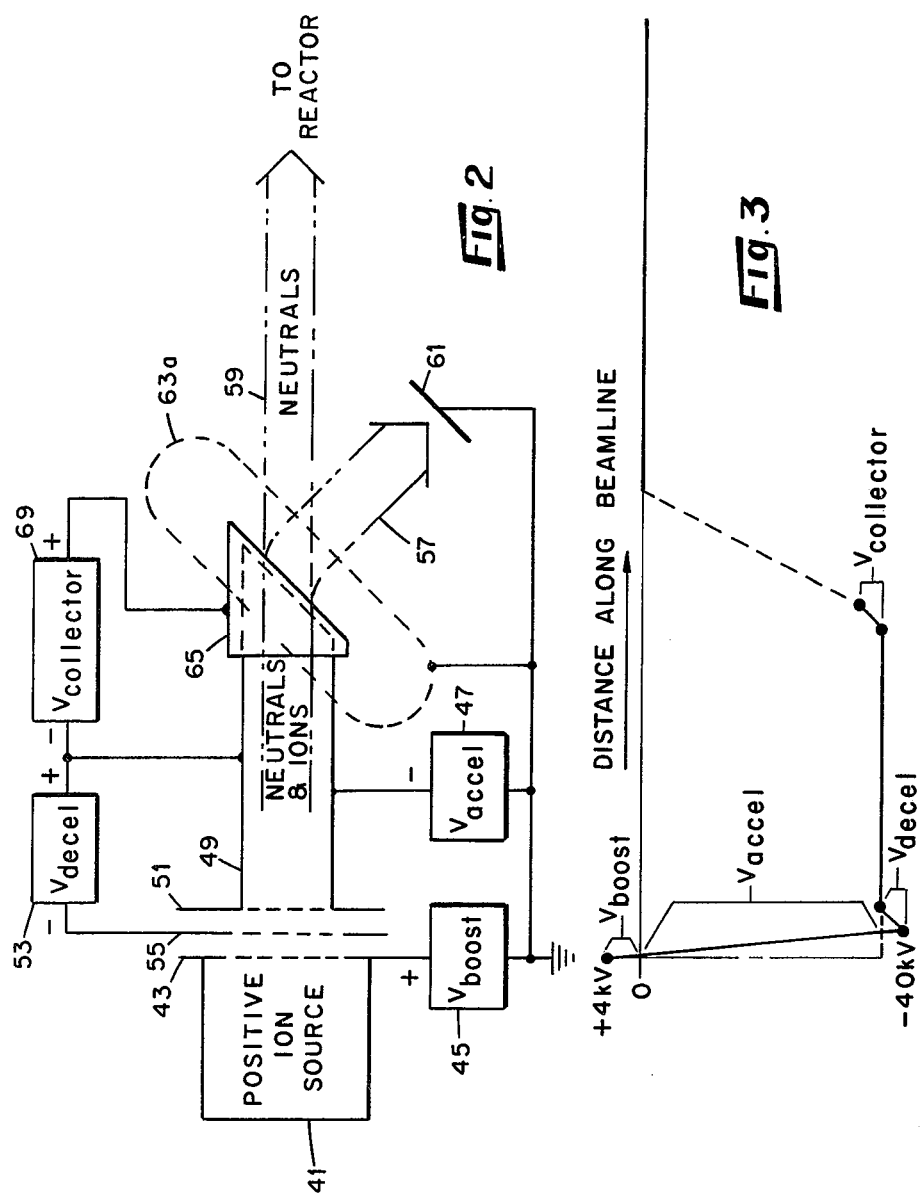

NEUTRAL BEAMLINE WITH ION ENERGY RECOVERY BASED ON MAGNETIC BLOCKING OF ELECTRONS

BACKGROUND OF THE INVENTION

This invention relates generally to neutral beam injection systems for use in controlled fusion devices such as tokamaks, magnetic mirror systems, bumpy tori and the like, and more particularly, this invention relates to improvements in neutral beam injectors with direct ion energy recovery.

In the field of controlled fusion or controlled thermonuclear reaction, a high temperature plasma is formed of fusionable light isotope ions contained within a magnetic field confinement or containment zone, in an evacuated region. Such light isotopic species may generally comprise one or more materials, such as hydrogen, deuterium, tritium, helium 3, etc., which undergo fusion reactions under appropriate conditions of time, density and temperature. These conditions may be brought about or supplemented by the injection of properly accelerated neutral particle beams of one or more of the appropriate species in the proper trajectory with respect to the magnetic field. A portion of the energetic neutral particles are ionized either by collision with other neutral or charged particles or by action of the magnetic confinement field (Lorentz force) and are accordingly trapped to form a high temperature plasma in the magnetic containment zone. The injected particles must be neutral in order to penetrate the very strong magnetic field containing the plasma.

Since the neutral particles cannot be directly accelerated to high velocities, i.e., high kinetic energies, they are produced in an indirect manner from an ion source. It has been the practice to produce a neutral beam by accelerating either positively or negatively charged ions of one or more of the above appropriate species emerging from an ion source through a gas cell neutralizer wherein they interact with neutral atoms of the same species at a specified pressure through charge exchange. A portion of the ions are neutralized and emerge from the neutralizer as high energy neutral particles along with the accelerated beam passing therethrough. The beams are generated and manipulated in a vacuum chamber whose pressure is maintained at the selected pressure level by a cryopumping system.

Since the beam emerging from the neutralizer also contains electrons and unneutralized ions, some means must be provided to separate the neutral particles from the electrons and ions to obtain the desired neutral beam for injection into the magnetically confined plasma. This is accomplished by either electrostatic or magnetic field blocking of the electrons and diversion or bending of the positive charged ions from the primary beam path direction to allow the neutral beam to continue along the accelerated beam path. Depending upon the species and energy of the initially ionized particles of the beam, the neutral particle beam emerging from the neutralizer contains a large proportion of high energy unneutralized ions. Present ion sources operating at energies of about 40 kilo-electron volt (keV) per nucleon at 60 amps ion current provide about a 60% conversion efficiency in the neutralizer cell. As future ion sources are developed toward energies of about 100 keV, or higher, per nucleon, at comparable current levels, the conversion efficiency will drop and may drop to about 15% for H° neutrals in $H_2$ gas and about 45% for D° neutrals in $D_2$ gas, which represents an intolerable energy loss.

Therefore, in order to produce neutral beams for fusion plasma heating efficiently, the energy contained in the unneutralized fraction of the beam must be recovered. In order to recover the kinetic energy of the charged ion component of the beam emerging from the neutralizer cell, in the form of usable electric energy, the electrons present in the beam must be blocked and the beam ions diverted from the neutral beam line, decelerated and collected. The electrons must be blocked from entering the ion collector since they would be accelerated into the ion collector thereby producing an energy loss which may be equal to or greater than the recovered ion energy.

In the process of developing direct energy recovery in neutral beam injectors, various means have been devised or suggested, which may be generally divided into two groups, depending upon the ion deflection method used. There are either electrostatic or magnetic ion deflection methods.

An electrostatic deflection system is described in "Proceedings of 7th Symposium on Engineering Problems of Fusion Research," 1978, By W. L. Barr et al, Vol. I, p. 308. This paper discloses an electrostatic system developed at Lawrence Livermore Laboratory, Livermore, California, in which the neutralizer cell wall is held at ground potential, the ion beam collector is biased highly positive (approx. 1000 kv) and the electrons emerging from the cell are repelled by a negative voltage (approx. 20 kv) applied to electrodes which closely encompass the beam. One negative electrode is placed between the neutralizer cell exit and a generally funnel-shaped ion collector which also encompasses the beam. The other negative electrode is placed at the exit of the collector. The ion collector acts to decelerate and collect the ions diverging radially from the beam. The negative electrodes in this system must be biased sufficiently negative to drive the beam potential negative even on the axis in the presence of the positive-ion space charge and the nearby positive-ion collector. There are inherent problems with this system which include severe gas-pressure requirements for efficient direct conversion, increased beam line length in order to establish the retarding electric field which consequently reduces the neutral power transmission efficiency and the need to hold a high positive potential on the ion collector in the presence of spatial and time varying magnetic fields. The most critical gas-pressure requirement placed on this direct conversion system is imposed by the power load resulting from the acceleration and collection of the slow ions and electrons produced by ionization and charge exchange of the background gas. The resulting emission of secondary electrons at negative high voltage and the subsequent power drain must also be considered.

Other electrostatic electron-blocking and ion-deflection systems utilizing electrostatic grids which intercept the beam are discussed by P. Raimbault in EUR-CEA-FC-823, 1976. One specific system outlined in this reference employs a cylindrical grid arrangement which surrounds the beam exiting the neutralizer which is biased negative with respect to the neutralizer to suppress the electrons. The ion collection method of this system has one advantage and one disadvantage compared to the Barr system mentioned above. The single advantage is that the ion collector is at ground potential. However, in addition to the other disadvantages to the Barr system, the Raimbault system also suffers from direct interception of the ion beam on the high negative potential, cylindrial grid. Not only is the ion energy lost, but secondary electrons ejected from the grid by the ion impingement constitute an additional power loss. In the proposed Raimbault system, the ion source is operated at near ground potential and the ions are accelerated by operating the neutralizer at a high negative potential. The positive potential, $V_R$, at which the ion source is held above ground potential is necessary to ensure that the unneutralized ions are able to reach the ion collector plate.

By operating the neutralizer at a negative potential to accelerate the ions from the source makes it possible to recover the energy of the ions at ground potential and eliminates the problems associated with a high positive potential deceleration voltage on the ion collector for recovery of their kinetic energy directly.

Further, as pointed out above, it has been suggested in the art to employ magnetic means for deflecting the ions from the accelerated beam and it has been further suggested to employ magnetic suppression, or blocking, of the electrons from the beam emerging from the neutralizer tube. It has been recognized in the art that magnetic suppression would be advantageous in that the magnetic field can penetrate beams that are too thick and too dense for electrostatic suppression to work. However, in the prior art experiments employing magnetic suppression, electrostatic fields also present in the system from positive potential deceleration ion collectors, have produced unnecessarily long beam lines and/or complicated electron motions which produce long-lived electrons in the system some of which cause unwanted power drain or which tend either to reionize the neutral beam exiting the neutralizer cell or deionize the positive ions directed to the energy recovery ion collectors.

Therefore, it will be appreciated that there is a need for a workable system for a neutral beamline with ion recovery based on the advantages of magnetic blocking of electrons and beam ion deflection.

SUMMARY OF THE INVENTION

In view of the above need, it is an object of this invention to provide an improved neutral beamline for generating an energetic neutral beam with unneutralized ion energy recovery based on magnetic blocking of electrons in the ion beam neutralizer.

Another object of this invention is to provide an improved neutral beam line generator as in the above object using an ion source held at near ground potential, thereby allowing energy recovery at ground potential.

Another object of this invention is to provide an improved neutral beamline system as set forth in the above objects wherein the beamline is shorter than the conventional system, thereby permitting higher neutral power transmission.

Another object of this invention is to provide an improved neutral beamline system for high power applications in which the problems associated with the unneutralized beam energy disposal of the unneutralized portion of the beam are solved.

Another object of the invention is to provide an improved neutral beamline wherein ion energy recovery is independent of gas-pressure limitations present in other systems.

Another object of this invention is to provide an improved neutral beamline system as in the above objects which may be retrofit to existing neutral beam injectors, thereby increasing their electrical efficiency and high-power, long-pulse capability.

Additional objects, advantages and features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the improved neutral beamline generator, employing unneutralized ion energy recovery from ions exiting a neutralizer tube through which ions from an ion source operated at ground potential are accelerated to produce a fraction of high kinetic energy neutral particles exiting said neutralizer tube, may comprise means including an electron collecting surface electrically biased sufficiently positive relative to said neutralizer tube for generating an electric field sufficient to collect the electrons drifting from the neutralizer tube with a negligible energy loss. A primary electric field in parallel opposition to the beam exiting the neutralizer tube is generated by virtue of the applied electrical potentials. A means is provided for generating a magnetic field transverse to the beam exiting said neutralizer tube and said primary electric field. The magnetic field is of sufficient strength to magnetically suppress the flow of electrons from the exit of said neutralizer tube and force electrons exiting the neutralizer tube to drift in an E x B fashion into the electron collector, while simultaneously in union with the retarding effect of the primary electric field causing the ions from the neutral beam exiting the neutralizer tube to be collected at ground potential. By operating the ion collecting means at ground potential, the ions are decelerated to ground potential and the charge is collected thereon, returning their kinetic energy directly to the high-voltage power supply. The energy used to accelerate the ion is not expended. This reduces the net power supply requirements for generating the ions initially since the kinetic energy of the unneutralized ions is returned to the high-voltage supply, thus improving the efficiency of the neutral beam generator system.

By closely coupling the electric and magnetic fields with the exit end geometry of the neutralizer tube the electron suppression and ion deflection occur simultaneously. This reduces the drift distance of the combined neutral particles and ions thereby decreasing the amount of reionization of the neutral particle beam and deionization of the ion beam components exiting the neutralizer tube. In addition, the beamline length is held to a minimum thereby increasing the neutral beam transmission efficiency. Moreover, direct recovery of the unneutralized ion energy negates the need of developing and employing a high power density unneutralized beam disposal method.

Depending upon the light isotopic species beam being neutralized, between 20 and 80 percent of the energy of the full energy unneutralized ions may be recovered.

BRIEF DESCRIPTION OF THE DRAWINGS

The accompanying drawings, which are incorporated in and form a part of the specification, illustrate the present invention and, together with the description, serve to explain the principles of the invention. In the drawings:

FIG. 2 is a schematic illustration of a neutral beam generator employing direct energy recovery of positive ions based on magnetic blocking of electrons in accordance with the present invention;

FIG. 3 is a plot of the operating potentials of the various components along the beam generator shown in FIG. 2;

DETAILED DESCRIPTION

Figure 1:
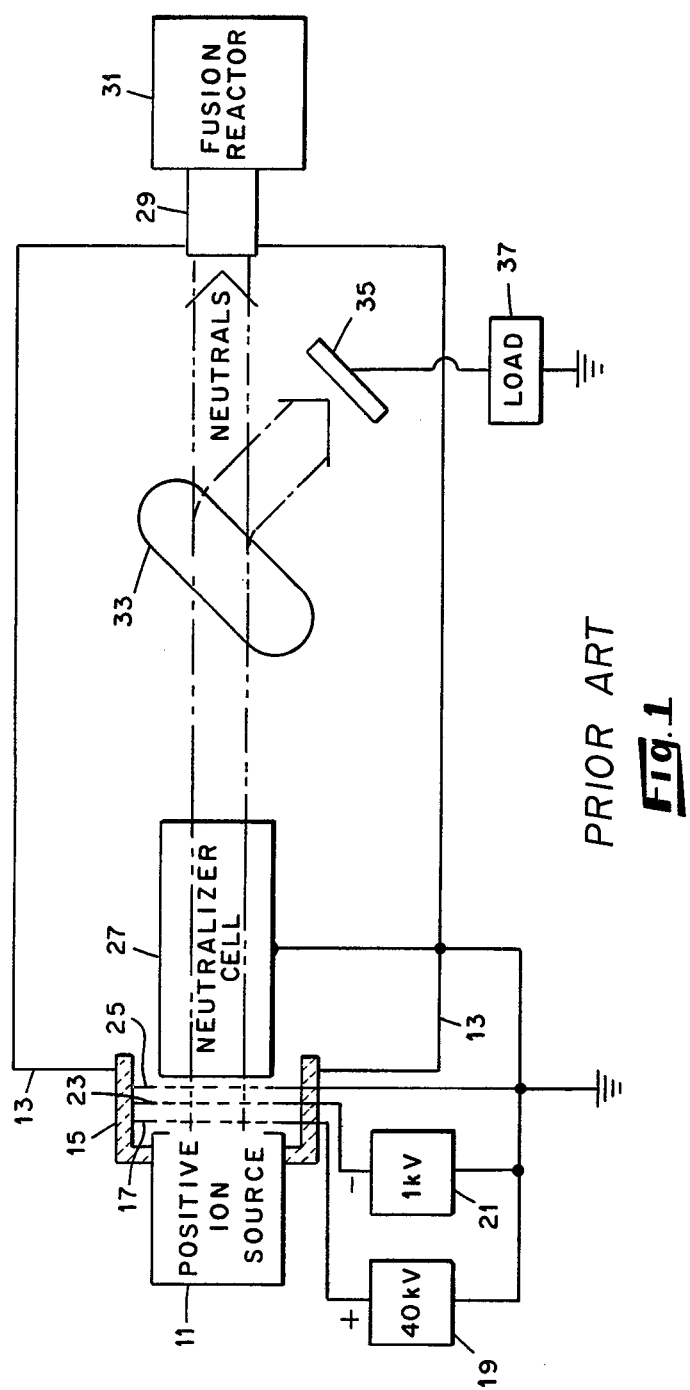
FIG. 1 is a schematic illustration of a prior art neutral beamline generator with direct energy recovery.

Referring now to FIG. 1, there is shown schematically a prior art neutral beamline with direct energy recovery of positive ion energy. One typical neutral beamline of this type is described in U.S. Pat. No. 3,713,967, issued Jan. 30, 1973, to Gordon W. Hamilton et al for "Energetic Neutral Particle System for Controlled Fusion Reactor." A light isotopic species positive ion source 11 is operated at a high positive potential, typically +40 kv for a source of hydrogen (H) or deuterium ions, for example. The ion source may be mounted to a vacuum enclosure 13 for the beamline system by means of an electrical insulator and seal assembly 15. The ion beam from the source 11, is accelerated by means of a +40 kv power source 19 connected between ground and the plasma grid 17 of the source 11. A slight decel voltage typically 1 kv negative is applied by means of a −1 kv power source 21 between ground and the extraction grid 23 of the ion source. The exit grid 25 of the source is tied to ground potential. The negative decel voltage applied between the extraction grid 23 and the exit grid 25 prevents electrons generated in the neutralizer cell 27 from drifting back into the ion source 11.

The beam of positive ions extracted from the ion source 11 is thus accelerated to ground potential and remain at ground potential through the gas cell neutralizer 27 by connecting the neutralizer cell to ground potential. In the gas cell, some of the positive ions entering the cell are converted to neutral particles with high kinetic energy and travel along the accelerated beam path and into an evacuated drift tube 29 coupled to a neutral beam utilization device, such as a fusion reactor 31 to heat a magnetically confined reactor plasma.

Magnet poles 33, located along the beamline a short distance from the exit end of the neutralizer cell 27 are arranged to deflect the positive ions from the neutral beamline into converter cells 35. In the converter cells 35, the electrons contained in the beam for space charge neutralization are blocked by means of electrostatic fields and strong positive fields are used to decelerate and collect the ions. The current produced from the collection may flow through an electrical load 37 or be fed back to reduce the acceleration source 19 power requirements.

An alternate scheme has been proposed for energy recovery based on magnetic suppression of electrons, as discussed above which employs a funnel-shaped ion collector encircling the beam downstream of the electrostatic suppressor electrode. This collector is also operated at a high positive decelerating potential and the recovered energy in the form of recovered ion current may be fed back to supplement the ion source current. These prior art systems have inherent disadvantages as pointed out above.

According to the present invention, a neutral beam generator with direct positive ion energy recovery based on transverse magnetic field suppression of electrons at the neutralizer tube output will now be described with reference to FIG. 2. It will be understood that the beam must be manipulated within a vacuum containment, such as the vacuum casing 13 shown in FIG. 1. However, in order to simplify the drawing, the vacuum casing is not shown in FIG. 2. Further, it will be obvious that it is necessary to remove the background gases and the deenergized species from which the charge has been collected. This is done as in any conventional beamline by cryocondensing vacuum pumping panels or other suitable vacuum pumping means (not shown).

Referring now to FIG. 2, a positive ion source 41, has its plasma grid 43 connected to a positive voltage source 45 of typically +4 kv for providing an acceleration boost voltage ($V_{boost}$). The primary ion acceleration voltage ($V_{accel}$) is provided by supply 47 which is connected between ground and the neutralizer gas cell 49, which is also connected to the exit grid 51 of the ion source. The acceleration voltage will depend upon the beam energy requirements and the ion source capacity. For the illustration here $V_{accel}$ is −40 kv for a 60 amp ion current. This is typical for heating plasmas in the Princeton Large Torus (PLT) research fusion reactor.

A deceleration voltage ($V_{decel}$) supply 53 is connected between the neutralizer tube 49 and the extraction grid 55 of ion source to provide a slightly negative (typically −1 kv) extraction grid voltage relative to the neutralizer tube 49 voltage to prevent the drift of electrons from the neutralizer back into the ion source. This biasing arrangement provides the potential distribution along the beamline as shown in FIG. 3. As will be seen from FIGS. 2 and 3, the ion beam 57 diverted from the neutral beamline 59 is decelerated to ground potential and the ion charge is collected on a grounded collector 61. It will be appreciated that the entire grounded enclosure may be used as an ion collector since the ions are decelerated to ground potential immediately at the neutralizer exit and thus may eliminate the need for the specific collector surface 61 to obtain energy recovery.

In order to obtain the energy recovery at ground potential, the electrons must be blocked at the neutralizer exit. If the electrons are allowed to go to one of the grounded surface potentials, they would be accelerated across the dotted path (the ion deceleration potential) in FIG. 3 and would collectively give up more energy than could be recovered from the positive ions. In fact, they would overcurrent the high voltage supply 47 and turn off the ion source.

Figure 4:
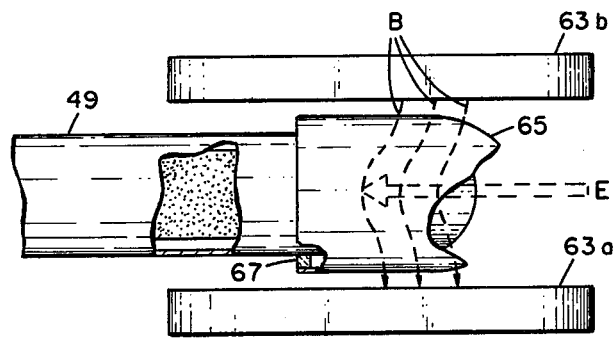
FIG. 4 is an enlarged detailed top view, partially broken away, of the coaxial electron collector and magnetic field generating pole pieces relative to the neutralizer tube exit end together with an illustration of the acting crossed electric and magnetic fields.
Figure 5:
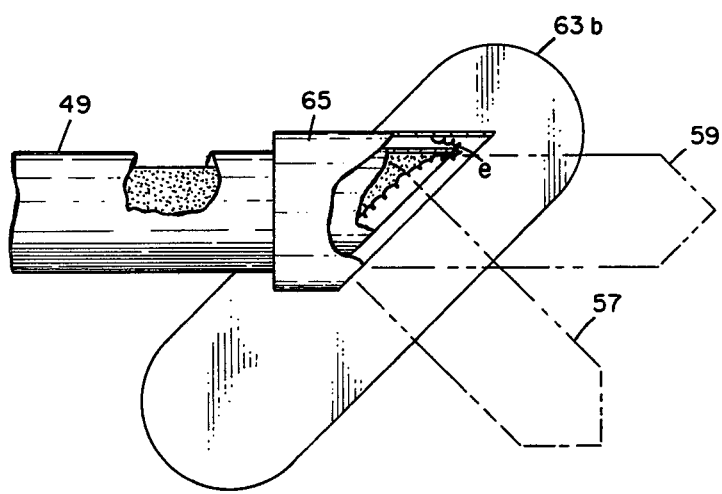
FIG. 5 is a detailed side view of FIG. 4 with the front magnet pole piece removed and with the neutralizer tube end and coaxial electron collector partially broken away to illustrate the E x B electron drift (e) to the electron collector.

To accomplish electron blocking, a magnetic field is provided transverse to the beam in the exit end of the neutralizer tube 49. Referring to FIGS. 2, 4, and 5, it will be seen that the field is provided by means of electromagnetic pole pieces 63a and 63b or equivalent magnetic field-producing means are disposed in juxtaposition across the beam path in the exit end of the neutralizer tube 49. The magnetic field may be varied to obtain the proper field strength to block the exit of the electrons. Also, the magnet pole pieces 63 may be tilted at a 45° angle, as shown, or placed at any convenient angle so long as the neutralizer tube 49 is tapered to conform to the magnets. As shown in FIGS. 2, 4 and 5, the end of the neutralizer tube 49 is tapered to conform to the 45° tilt of the magnet poles orientation and extended into the center of the axial extent of the magnetic field along the beamline provided by the pole pieces to closely couple the magnetic field with the neutralizer end geometry. This ensures a maximum magnetic field for blocking the neutralizer generated electrons.

It will be appreciated that other configurations for producing the field transverse to the beam may be employed, especially since the ion beam charge is collected at ground potential.

To remove the small portion of electrons, which are not forced back into the neutralizer by the blocking magnetic field, an electron collector ring 65 is mounted around the end opening of the neutralizer tube by means of electrical insulators 67. The collector ring is made of a nonmagnetic electrically conductive material, such as copper, in the form of a collar with the same end geometry as the neutralizer tube 49 end, i.e., tapered at a 45° angle at the tube exit end, and extends about 1.5 centimeters past the neutralizer tube end. A positive voltage supply 69 is connected between the neutralizer 49 and the electron collector collar 65 to apply a slightly positive (approx. 300 V) bias voltage ($V_{collector}$, FIG. 3) relative to the neutralizer 49 which is biased highly negative.

The operation of the system may best be explained with specific reference to FIGS. 4 and 5. The electrons streaming toward the exit of the neutralizer 49 together with the ions and neutrals generated in the neutralizer gas cell first experience an increasing magnetic field (B) perpendicular to the general direction of electron travel with the beam as well as an accelerating primary electric field (E) generated by the negatively biased neutralizer 49 and the rest of apparatus at ground potential exterior to the neutralizer as they approach the end of the neutralizer tube 49. The electrons are then carried out toward the neutralizer end edge by an E x B drift while gyrating as indicated by the e path illustrated in FIG. 5. Once the electrons pass the edge of the neutralizer tube they are accelerated into the electron collector ring. The ring is preferably coaxially disposed about and spaced from the neutralizer tube exit end and functions as an interposed surface, biased a few hundred volts positive with respect to the neutralizer, that terminates the electrons. The energy loss is only a few hundred electron volts of energy instead of the typically 40 keV (depends on the value of $V_{accel}$) they would give up in traveling to one of the grounded surfaces.

It should be pointed out here that all the vacuum enclosed surfaces beyond the neutralizer cell 49 are at ground potential including the magnet pole pieces 63. Therefore, the ions coming out of the neutralizer 49 experience both retardation due to the primary electric field and transverse deflection due to the magnetic field. Initially, the ion gyroradius is typically several times greater than the gas cell diameter, but it is reduced as the ions are decelerated within the pole region to a speed corresponding to the accelerator boost potential. When they finally reach the surroundings (the ion collector, 61, vacuum chamber walls or pole faces), they impart only the energy corresponding to the accelerator boost potential. The boost potential 45 is kept as low as possible and lies between 2% and 10% of the $V_{accel}$ potential 47 depending upon various beamline parameters. The role of the $V_{boost}$ potential is to ensure the ions have enough energy to strike a grounded surface (energy recovery) rather than deflect back into the neutralizer cell 49 (total energy loss). The exact motion of the ions, however, depends on the electric and magnetic field configuration in the magnetic pole region. Free electrons outside the gas cell, in the magnet region and the surroundings, will not hinder the ion current recovery since they are approximately in the field free-region at ground potential.

The deceleration of the full-energy ions to an impact velocity at an energy level equal to the $V_{boost}$ potential returns most of their kinetic energy (corresponding to the $V_{accel}$ potential) to the electrical power supply system used to accelerate them. Thus, their main energy content is recovered, and the ions convert back to low energy neutral gas to be pumped out of the vacuum chamber as by cryopumping.

In the neutralizer, three different energy groups of ions of the source species are present: full energy (corresponding to the initial kinetic energy provided by $V_{accel} + V_{boost}$), one-half energy, and one-third energy. The three energy groups originate in the atomic, diatomic and triatomic states of the source species. As pointed out above various light isotopic species may be used depending upon the particular reactor application requirements. The full energy ions are of primary interest for the purpose of energy recovery since they represent the primary energy component of the beam (85–90%). However, if the one-half and one-third energy ions exit the neutralizer with the full energy ions they do not have sufficient energy to reach the ground potential surfaces since the potential drop between the gas cell and the surroundings is almost the full-energy potential. These ions tend to bend in smaller orbits due to the magnetic field and are forced to strike either the neutralizer tube or electron collector at which point their energy is lost. If they strike an exterior wall of the neutralizer tube or electron collector, additional energy may be lost due to secondary electrons emitted at impact some of which may travel to a grounded surface. The secondary electrons which are accelerated directly to ground potential detract from the energy recovery efficiency of the full energy ions. This loss can be controlled substantially by proper selection of the magnetic field strength to block the fractional energy ions from exiting the neutralizer. Thus, the fractional energy ions are dumped back into the neutralizer without generating parasitic secondary electrons.

EXAMPLE

A modified duo PIGatron ion source capable of 40 kv/60 A operation (developed for heating plasmas in the PLT and impurity study experiment) was used to test an experimental configuration as illustrated in FIG. 2. This source is particularly well suited for every recovery investigation due to the high-percentage (approx. 85%) full-energy ion component with a hydrogen beam. An available ion current ($I_A$) of 18 amps at 40 keV was used. The proof of principle experiment was limited to approximately 20 kV due to electronic problems. The following supply voltages were used:

$V_{boost} = 800$ v
$V_{accel} = 20$ kV $V_{decel} = 1$ kV
$V_{collector} = 300$ v A conventional neutral beam target was used to measure the neutral beam energy. The recovered ion current $I_R$ was typically 1 amp. The electron leakage current, from full energy electrons impinging upon the grounded ion collector, was typically less than 1 amp. The leakage current ($I_e$) was determined by calorimetrically measuring the power drain to water cooled, ground potential plates covering the magnet poles and dividing this power by the $V_{accel}$ potential. The efficiency (n), which may be defined as follows $$n = \frac{I_R - I_e}{I_A} \times 100$$

varied between 20% and 80%. The large error was due to subtracting two large numbers to obtain a small difference. The magnetic field strength was typically 1000 Gauss. In one test run, the magnetic field was turned off, the electron collector current immediately destroyed the 400 amp rated blocking diodes in the collector voltage supply. This illustrates the electron blocking function of the strong magnetic field at the neutralizer exit. Since electron blocking is achieved by a magnetic field, the size and density of the beam are not critical as in electrostatic blocking schemes.

Thus, it will be seen that a charged particle recovery system for a neutral ion beam generator based on magnetic blocking of electrons is provided. The blocking magnet in combination with the ion retarding electric field at the beam neutralizer exit end separates the charged ionic particles from the neutral beam and electrons to provide energy recovery of the full energy ion component of the beam.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. In a neutral beam injector system for generating and directing an energetic neutral particle beam along a beamline wherein said energetic neutral particle beam is derived from a beam of ions of a selected light isotopic species generated in a ground potential operated ion source and accelerated along said beamline through a neutralizer means wherein a significant portion of said ions are converted into energetic neutral particles together with electrons and residual energetic ions directed along said beamline exiting said neutralizer means, the combination of a system for direct recovery of the kinetic energy of said residual energetic ions comprising:

power supply means for applying an accelerating electrical potential to said neutralizer means to accelerate said ions from said ground potential operated ion source to a selected kinetic energy level along said beamline through said neutralizer means;

magnetic field generating means coupled with the beam exit region of said neutralizer means for producing a magnetic field (B) in said exit region transverse to said beam path of sufficient strength to block said electrons from said neutral beam path at said exit region and deflect said residual ions from said beam path;

an ion collector means for collecting the charge of said deflected residual ions exiting said neutralizer, said collector means including at least one ground potential ion charge collecting surface disposed in the path of said deflected residual ions so that a retarding electric field (E) is generated in parallel opposition to said beam exiting said neutralizer in said exit region thereof by virtue of said accelerating potential applied to said neutralizer, said E field being transverse to said magnetic field B in said neutralizer exit region so that an E x B field is generated in said exit region of said neutralizer and said residual ions exiting said neutralizer are decelerated, thereby recovering their kinetic energy and their charge collected on said at least one ground potential ion collector surface;

an electron collecting means including an electron collector surface disposed closely adjacent said exit region of said neutralizer and electrically biased slightly positive with respect to said neutralizer for collecting said electrons which drift in an E x B fashion in said exit region of said neutralizer into said electron collector surface upon exiting said neutralizer so that said electrons are terminated at a potential substantially removed from ground potential to prevent energy loss due to said electrons being accelerated into said ground potential ion collecting surface.

2. The combination as set forth in claim 1 wherein said ion source is a positive ion source and said power supply means includes a power source connected between said neutralizer and ground potential for applying a negative acceleration voltage to said neutralizer means relative to said ground potential operated ion source.

3. The combination as set forth in claim 2 wherein said ion source further includes means for applying a positive boost acceleration voltage to said ions accelerated through said neutralizer substantially lower in amplitude than the amplitude of said negative acceleration voltage applied to said neutralizer means to aid in recovering the charge of said energetic residual ions deflected from said beamline at said at least one ground potential ion collector surface.

4. The combination as set forth in claim 3 wherein said neutralizer means includes a cylindrical neutralizer cell coaxially encompassing said beam path exiting said ion source to said exit region thereof and wherein said electron collector means includes a cylindrical electrically conductive collar coaxially disposed about and electrically insulated from said neutralizer cell, said collar extending axially past the exit end region of said neutralizer cell sufficient distance to prevent the escape of electrons drifting past said exit region of said neutralizer cell, said collar being constructed of a non-magnetic material.

5. The combination as set forth in claim 4 wherein said magnetic field generating means includes a pair of opposite polarity magnet pole pieces disposed outward of said electron collector collar in juxtaposition across said beamline at said exit region of said neutralizer to establish said B field transverse to said beamline in said exit region of said neutralizer.

6. The combination as set forth in claim 5 wherein said exit region of said neutralizer cell extends centrally into the axial extent of said magnetic field along said beamline provided by said pole pieces to closely couple said magnetic field with said neutralizer exit region.

7. The combination as set forth in claim 6 wherein said neutral beam injector system includes an electrically conductive vacuum containment vessel enclosing the components defined therein, said vessel having a beam exit drift tube adapted for passage of said energetic neutral beam exiting said vessel.

8. The combination as set forth in claim 7 wherein said containment vessel is connected to ground potential and comprises one of said at least one ground potential ion collector surface.

9. The combination as set forth in claim 8 wherein said magnet pole pieces are connected to ground potential and comprise further ones of said at least one ground potential ion collector surface.